United States Patent [19]

Purcell et al.

[11] Patent Number: 4,522,732
[45] Date of Patent: Jun. 11, 1985

[54] PROCESS FOR RECOVERING PETROLEUM FROM A GEOLOGICAL FORMATION

[75] Inventors: Robert F. Purcell, Roselle, Ill.;
Robert B. Kayser, Evergreen, Colo.

[73] Assignee: Angus Chemical Company, Northbrook, Ill.

[21] Appl. No.: 609,637

[22] Filed: May 14, 1984

Related U.S. Application Data

[63] Continuation-in-part of Ser. No. 284,438, Jul. 20, 1981, abandoned.

[51] Int. Cl.³ .................... E21B 43/24; E21B 43/22
[52] U.S. Cl. .................... 252/8.55 D; 166/270; 166/303
[58] Field of Search .................... 252/8.55 D, 8.55 R; 166/270, 272, 303

[56] References Cited

U.S. PATENT DOCUMENTS

| 3,302,713 | 2/1967 | Ahearn et al. | 252/8.55 |
| 3,464,492 | 9/1969 | Friedman | 166/270 |
| 3,799,263 | 3/1974 | Prillieux | 252/8.55 |
| 4,043,922 | 8/1977 | Palmer et al. | 252/8.55 |
| 4,191,252 | 3/1980 | Buckley et al. | 166/302 |

FOREIGN PATENT DOCUMENTS 639050  3/1912  Canada .................... 166/272

*Primary Examiner*—Herbert B. Guynn
*Attorney, Agent, or Firm*—Robert H. Dewey

[57] ABSTRACT

In the process for recovering petroleum having acidic components from a geological formation containing it by injecting steam in the formation, the improvement comprising conducting the steam injection in the presence of one or more water-soluble amines.

9 Claims, No Drawings

PROCESS FOR RECOVERING PETROLEUM FROM A GEOLOGICAL FORMATION

CROSS-REFERENCE TO RELATED APPLICATIONS

This application is a continuation-in-part of applicants' copending application Ser. No. 284,438, filed July 20, 1981, now abandoned.

BACKGROUND OF THE INVENTION

This invention relates to an improved process for recovery of petroleum from a geological formation containing it. In a particular aspect, this invention relates to an improvement in the process for stimulating petroleum recovery using steam utilization.

The yield of petroleum from a geological formation is usually far from the total petroleum present because once the pressure on the formation is relieved, there is no easy method for recovering the residual petroleum. This residual petroleum is usually of high viscosity and flows to the producing well at a very slow rate—if at all.

It is known to improve petroleum recovery from a geological formation containing it by the process of injecting steam into the formation to heat the petroleum thereby reducing the viscosity and permitting it to flow to the producing well. The steam can be introduced through the production well itself, or it can be injected through one or more injection wells spaced from the production well.

In the former case, the steam is injected for a limited time thereby heating the petroleum and surrounding formation. The steam injection is then stopped and the heated petroleum, having reduced viscosity, flows into the production well.

In the latter case, steam is injected on a continuous basis, more or less, and the steam forms a front which moves through the petroleum-bearing formation and forces the heated oil ahead of it into the production well.

In many petroleum sources, there are acidic components present. Advantage is taken of this in water-flooding processes for petroleum recovery by adding an alkali metal hydroxide, e.g. sodium hydroxide which reacts with the acidic components to form soaps. These soaps reduce the interfacial tension between the oil and water and help to improve the flow of the petroleum. However, this use of alkali metal hydroxides does not lend itself well to the steam injection process because separate means must be provided to inject the caustic into the formation. Also, caustic, being non-volatile, cannot be present in steam, except perhaps as a mist, and remains for the most part in the aqueous phase. As the steam cools, it condenses and water collects in the bottom of the reservoir, taking the alkali hydroxide with it, where it is useless. Fresh steam entering the formation overrides the condensed water but is less effective due to loss of alkali hydroxide. Furthermore, there are also usually present in the formation, compounds of calcium and magnesium which, at the elevated temperatures used, react preferentially with the alkali hydroxide. This is advantageous because it reduces the amount of sodium available to form the petroleum soaps and also generates undesirable, water-insoluble compounds which may tend to plug the formation.

There is, therefore, a need for an improved process for recovering petroleum by the use of steam.

SUMMARY OF THE INVENTION

It is an object of this invention to provide a process for the recovery of petroleum from a geological formation containing it.

It is another object of this invention to provide an improved process for the recovery of petroleum from a geological formation using steam to heat the formation. Other objects will be apparent to those skilled in the art from the disclosure herein.

It is the discovery of this invention to provide an improved process for recovering petroleum from a geological formation containing it by heating the formation with steam at elevated temperature and pressure in the presence of 2-amino-2-methyl-1-propanol (AMP) or N,N-dimethylaminomethyl propanol (DMAMP) or mixture thereof in an amount equivalent to about 1–5 g per unit pore volume of the geological formation.

DETAILED DISCUSSION

In the practice of this invention, the steam injection process is carried out as is known except that the amine is added to the steam in an amount equivalent to about 1–5 g per unit of pore volume of the formation, preferably about 2–4 g.

The geological formation which constitutes the petroleum reservoir can be either oil-wet or water-wet. That is, if water is present, the rock can be coated with oil with the water present as a discontinuous phase, or the rock can be coated with water with oil present as a discontinuous phase.

The petroleum contained in the reservoir usually contains organic acids as a proportion of its components. As the steam and condensate advance through the formation, the amine reacts with the organic acids in situ, forming soaps. In a water-wet formation, these soaps lower the interfacial tension between the petroleum and the advancing steam and condensate front. In an oil-wet formation, the strongly hydrophilic soaps tend to displace the oil from rock formations thereby wetting the mineral surface. In both instances, the amine soaps allow the heated petroleum to be separated more easily from the substrate.

The amines useful in the practice of this invention are commercially available and the usual commercial grades are satisfactory.

The amine can be injected in any suitable manner but preferably it is dissolved in the water (i.e. the boiler water) to be used to generate the steam injection. These amines are volatile and the vapors accompany the steam into the injection well. However, the amine can be injected as a side stream into the steam line, either continuously or intermittently, and either as the liquid, neat or in solution, or as the vapor phase. Other suitable means of injecting the amine will be obvious to those skilled in the art and it is not intended that the invention be limited by the manner in which the amine is introduced into the geological formation.

The amount of amine to be used is not exact but in general, a range of from about 0.1% to 5% by weight in the boiler water is sufficient.

The invention will be better understood with reference to the following examples. It is understood, however, that these examples are intended merely to illustrate the invention and it is not intended that the invention be limited thereby.

EXAMPLE 1

An experiment is conducted in the laboratory using a preserved core sample obtained from a geological formation. The core sample is divided into two equal portions and are each loaded into a steel column. The top of each column is connected to a steam boiler and the bottom is fitted with an outlet of reduced diameter opening into a receiving vessel. Distilled water is placed in the steam boiler and in one generator, sufficient AMP is added to form a 5% by weight solution. The boilers are then heated to produce steam which is passed through the core sample and the effluent mixture of steam, condensate water and crude oil is recovered in the receiving vessel. It is readily seen by measuring the effluent that the steam containing AMP provides much greater yield of petroleum than steam without AMP.

EXAMPLE 2

Berea sandstone was selected as the oil-bearing stratum for this and other tests. It was thoroughly cleaned, then a known quantity of oil was absorbed into the sandstone and tests were run to recover it. The preparation of the stone was conducted as follows.

Cylindrical cores, 1.5 inches in diameter and approximately 3 inches long were drilled from a Berea sandstone block using a diamond core drill lubricated and cooled with water. The cores werre fired in a muffle furnace at 1100° F. for eight hours after which permeability to air and Boyle's law porosity were determined. Results are given in Table 1.

Test cores were evacuated and pressure-saturated with a brine prepared by dissolving sodium chloride 7.350 g, calcium chloride 0.075 g and magnesium chloride 0.075 g, in a liter of water. The cores were then desaturated in a capillary pressure cell and flushed with kerosene which had been treated to remove any surface active agents which might be present. The treated kerosene was then displaced with crude oil having a viscosity of 1170 centipoise at 71° F.

The treated cores were subjected to simulated steam floods as follows. A core was mounted in a core-holder and steam at 475° F. and pressure of 530 psi from a steam generator was applied; then back-pressure was decreased until the desired flow rate of steam was achieved. The steam flood was continued until recovered water was 99.99%. Permeability to steam at terminal oil saturation was determined from the pressure and rate data.

The foregoing test with water (steam) only was used as the control. A second test was conducted using 2-amino-2-methylpropanol (AMP), 1.76% in water. As the steam flood began, an 0.25 pore volume slug of the solution was co-injected through the core at a rate of 1 ml/min.

The results are given in Table 2. Oil recovery was about 6.77% better than the control.

EXAMPLE 3

The experiment of Example 2 was repeated in all essential details except that the concentration of AMP was raised to 3.5%. The results are given in Table 2. Oil recovery was about 10.73% better than the control.

EXAMPLE 4

The experiment of Example 2 was repeated in all essential details except that the AMP solution was added to the water in the steam generator. The results are given in Table 2. Although oil recovery was slightly less than in Example 2, the difference is not believed to be significant in view of the small volumes involved.

TABLE 1

| Core Used in | Permeability, millidarcys | | Porosity % |
|---|---|---|---|
| | to Air | to Steam* | |
| Control | 314 | 28 | 20.2 |
| Example 2 | 213 | 18 | 19.4 |
| Example 3 | 260 | 27 | 20.7 |
| Example 4 | 201 | 25 | 19.4 |

*At terminal oil saturation

TABLE 2

| | Initial Saturation % Pore Space | | Terminal Oil Saturation | Oil Recovered |
|---|---|---|---|---|
| | Oil | Water | % Oil Space | % Pore Space |
| Control | 76.9 | 23.1 | 16.3 | 60.6 |
| Ex. 2 | 75.9 | 24.1 | 11.2 | 64.7 |
| Ex. 3 | 77.8 | 22.2 | 10.7 | 67.1 |
| Ex. 4 | 76.8 | 23.2 | 12.8 | 64.0 |

We claim:
1. An improved process for recovering petroleum from a geological formation containing it comprising injecting steam at elevated temperature and pressure into the formation mixed with an amine which is 2-amino-2-methylpropanol or N-N-dimethylaminomethylpropanol or mixture thereof, in an amount equivalent to about 1–5 g per unit of pore volume and recovering petroleum from said formation.
2. The process of claim 1 wherein the amine is N,N-dimethylaminomethylpropanol.
3. The process of claim 1 wherein the amine is aminomethylpropanol.
4. The process of claim 1 wherein the amine is vaporized and injected mixed with the steam.
5. The process of claim 1 wherein liquid amine is injected continuously into the steam.
6. The process of claim 1 wherein liquid amine is injected intermittently into the steam.
7. The process of claim 1 wherein the steam is injected intermittently through a production well.
8. The process of claim 1 wherein the steam is injected into one or a plurality of wells spaced from a production well.
9. The process of claim 1 wherein the steam is supplied by a steam boiler and the aminomethylpropanol or N,N-dimethylaminomethylpropanol is added to the boiler water in an amount of about 0.1% to 5% by weight.

* * * * *